United States Patent [19]

Michaels et al.

[11] Patent Number: 4,576,715
[45] Date of Patent: Mar. 18, 1986

[54] MEMBRANE PACK AND METHOD OF MAKING

[75] Inventors: John M. Michaels, Irvine; Gerald A. Croopnick, Trabuco Canyon; Richard A. Morris, Anaheim, all of Calif.

[73] Assignee: Dresser Industries, Inc, Dallas, Tex.

[21] Appl. No.: 234,394

[22] Filed: Feb. 13, 1981

[51] Int. Cl.[4] .............................................. B01D 13/00
[52] U.S. Cl. ..................................... 210/347; 210/486
[58] Field of Search ................... 264/22, 25; 156/73.1; 210/346, 347, 321.1, 321.2, 321.3, 321.4, 321.5, 232, 486; 55/16, 158; 208/180 P, 301; 422/48; 159/DIG. 27, DIG. 28; 165/167, 166, 165, 164

[56] References Cited

U.S. PATENT DOCUMENTS

| | | | |
|---|---|---|---|
| 3,376,179 | 4/1968 | Balamuth | 156/73.1 |
| 3,450,267 | 6/1969 | Jarvis | 210/321.1 |
| 3,506,510 | 4/1970 | Berleyoung | 156/73.1 |
| 3,506,511 | 4/1970 | Berleyoung | 156/73.1 |
| 3,508,986 | 4/1970 | Berleyoung | 156/73.1 |
| 3,564,819 | 2/1971 | Heulander et al. | 55/158 |
| 3,602,257 | 5/1971 | Berleyoung | 152/73.1 |
| 3,661,667 | 8/1972 | Gardner | 210/347 |
| 3,874,963 | 3/1975 | Barger | 156/73.1 X |
| 4,025,425 | 5/1977 | Croopnick | 210/347 |
| 4,132,649 | 1/1979 | Croupnick et al. | 210/347 |
| 4,154,792 | 5/1979 | Miller et al. | 422/48 |
| 4,159,250 | 3/1979 | Schnell | 210/321.3 |
| 4,165,082 | 8/1979 | Foucras et al. | 210/232 X |

Primary Examiner—Frank Spear
Attorney, Agent, or Firm—Freilich, Hornbaker, Rosen & Fernandez

[57] ABSTRACT

A membrane pack is constructed, which includes a highly porous carrier sandwiched between a pair of membrane structures that must be kept continuously wet, the pack having a hole and being sealed around the hole to prevent the passage of polluting liquid lying in the hole, into the porous carrier of the pack. The membrane pack is constructed by impregnating the carrier with a flowable polymer which can solidify, to leave a thin layer of the polymer on either surface of the carrier, and by then welding the polymer layers to membranes at either face of the carrier. Ultrasonic welding of the membrane structures to the carrier is performed while the membrane structures are wet, the ultrasonic welding dissipating moisture lying at the interface between the carrier and membrane structures to permit even hydrophilic polymers to be utilized.

10 Claims, 7 Drawing Figures

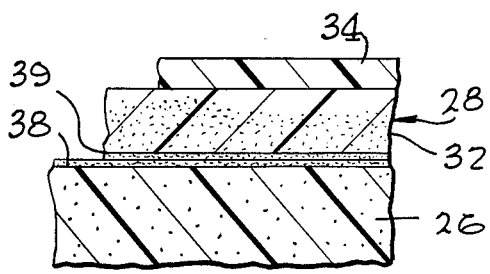
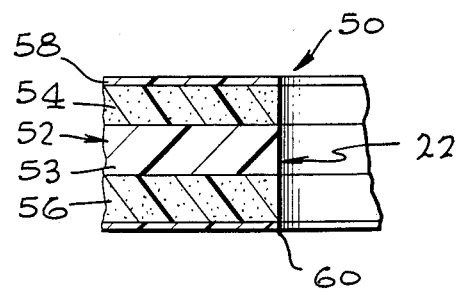
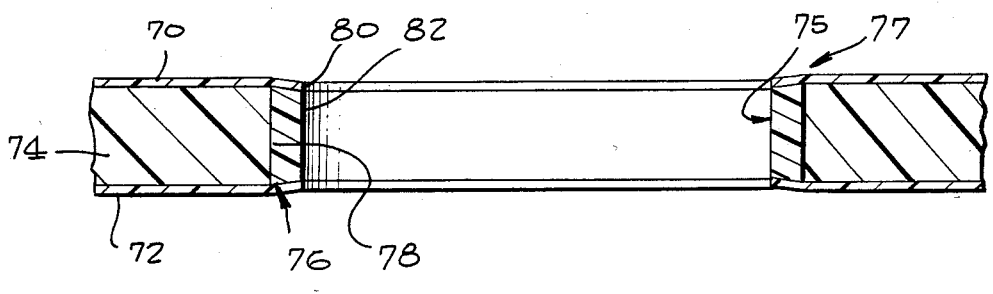
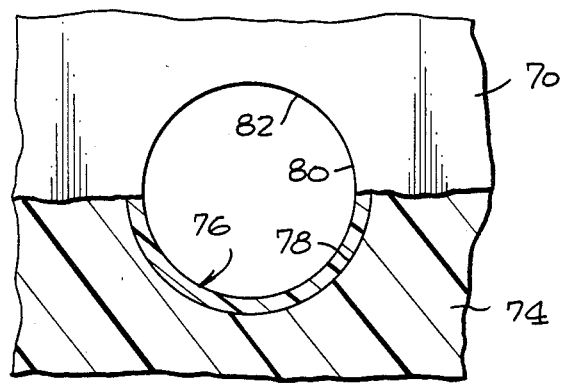

MEMBRANE PACK AND METHOD OF MAKING

BACKGROUND OF THE INVENTION

The purification of waste water or other fluids can be accomplished by the use of membrane packs which include membranes lying on the outside of a highly porous carrier. Feed fluid such as waste water can be applied under pressure to the outside of the membrane pack, so that permeate such as pure water can pass through the membrane into the porous carrier and travel along the carrier to a permeate outlet. U.S. Pat. No. 4,025,425 by Croopnick et al., describes an apparatus of this type, wherein the feed fluid (e.g. waste water) passes between membrane packs, permeate (e.g. pure water) passes through the membranes into the carrier and is expelled from the extreme periphery of the carrier, and the concentrate (left after much of the permeate has been removed) passes through several large exit holes in the pack to reach a collecting location. At any location where an edge of the membrane pack comes in contact with impure fluids such as the feed fluid or concentrate, as occurs in the exit holes of the device in the above-mentioned patent, there is danger of contamination of the permeate. It is necessay to construct such edges to securely seal the pores of the carrier against the influx of impure fluid, and to seal the carrier to the membranes to prevent leakage of impure fluid between them. A very secure seal is required in many applications, such as where the feed fluid and concentrate contain bacteria that could contaminate a pure water filtrate.

The sealing of a membrane structure to a carrier is complicated by the fact that many of the most useful membrane structures must be kept continuously wet, and are irreparably damaged if allowed to dry for even a short period of time. One technique for sealing a carrier to such membrane structures is to utilize a hydrophobic adhesive such as a silicone adhesive to join them, since water will not wet the silicone and it therefore can join to the surface of a membrane structure. However, silicone adhesives cannot be utilized in the presence of certain chemicals with a high pH such as 10 to 12 or more, as are encountered in the pulp processing industry. Other adhesives such as neoprene can provide a strong joint that is useful in the presence of such chemicals, but neoprene is wetted by water and will not stick to a wet membrane structure. A method and apparatus which enabled the secure sealing of a membrane structure to a carrier, and which enabled a wide variety of adhesives to be utilized to join to a wet membrane structure, would be of considerable value.

SUMMARY OF THE INVENTION

In accordance with one embodiment of the present invention, a membrane pack method and apparatus are provided, which enable secure sealing of a membrane to a porous carrier. The method includes impregnating the carrier with a solidifiable flowable material, leaving a layer of the material on a surface of the carrier, and then allowing the material to solidify. A membrane structure is placed against the carrier, on the layer of solidified material that impregnates the carrier, and the assembly is heat welded at its interface as by ultrasonic welding. The membrane structure may be of the type which must be maintained in a wet state. The ultrasonic welding drives out liquid at the interface between the solidifed material of the carrier and the adjacent surface of the membrane structure, so that such welding to a wet membrane structure can be performed even where a hydrophilic material is utilized to impregnate the carrier.

In another carrier pack, an insert of nonporous material lies within a hole in the carrier, or otherwise against an edge of the porous carrier. The membrane structure extends beyond the carrier to lie over the insert, and is bonded to the insert.

The novel features of the invention are set forth with particularity in the appended claims. The invention will be best understood from the following description when read in conjunction with the accompanying drawings.

BRIEF DESCRIPTION OF THE DRAWINGS

FIG. 4 is an enlarged view of the region 4—4 of FIG. 3.

FIG. 5 is a partial sectional view of a membrane pack constructed in accordance with another embodiment of the invention.

FIG. 6 is a partial sectional view of a membrane pack constructed in accordance with another embodiment of the invention.

FIG. 7 is a partially sectional plan view of the pack of FIG. 6.

DESCRIPTION OF THE PREFERRED EMBODIMENTS

Figure 1:
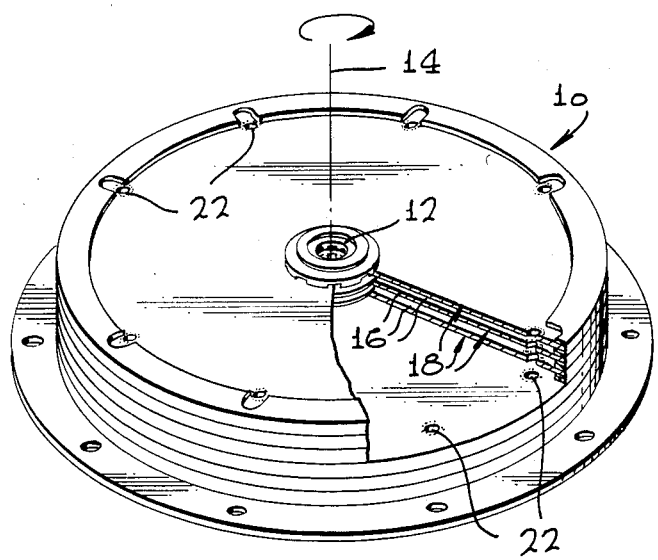
FIG. 1 is a partial perspective and sectional view of a purification apparatus of the present invention.
Figure 2:
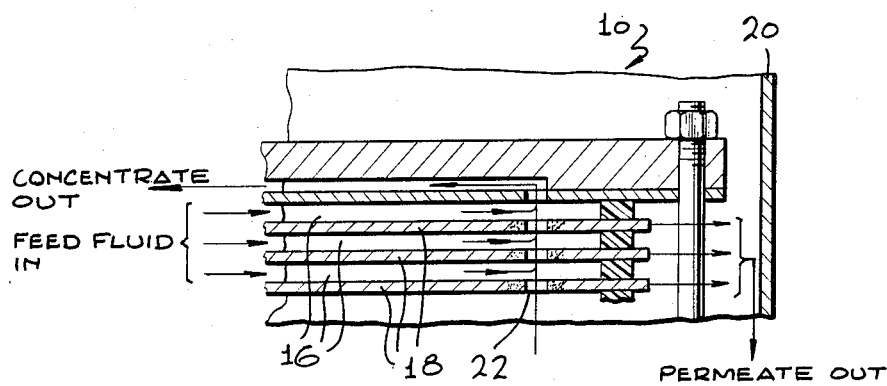
FIG. 2 is a partial sectional view of the purification apparatus shown in FIG. 1.

FIGS. 1 and 2 illustrate portions of a purification apparatus 10 which can receive a feed fluid such as waste water, and separate out a selected portion such as pure water, from the rest of the feed fluid which may contain solid waste particles including bacteria. In the particular apparatus 10, feed fluid is pumped along a central passageway 12, while the apparatus is rapidly rotated about its axis 14. The feed fluid passes through spaces 16 between membrane packs 18 of the apparatus to flow rapidly outwardly. During such flow, a component (e.g. pure water) of the feed fluid which can pass through membranes of the membrane packs 18, passes into the inside of the membrane packs. Such fluid, which may be referred to as permeate, moves radially within the membrane packs until it reaches the extreme peripheries of the packs and flies out against a wall 20 where it is collected. The portion of the feed fluid left after permeate has passed out of it, and which may be referred to as a concentrate, passes upwardly through aligned holes 22 in the membrane packs, for removal from the apparatus. The membrane packs must be securely sealed in the regions immediately around the holes 22, to assure that concentrate moving through the holes does not enter any of the membrane packs 18 to mix with the permeate moving therethrough.

Figure 3:
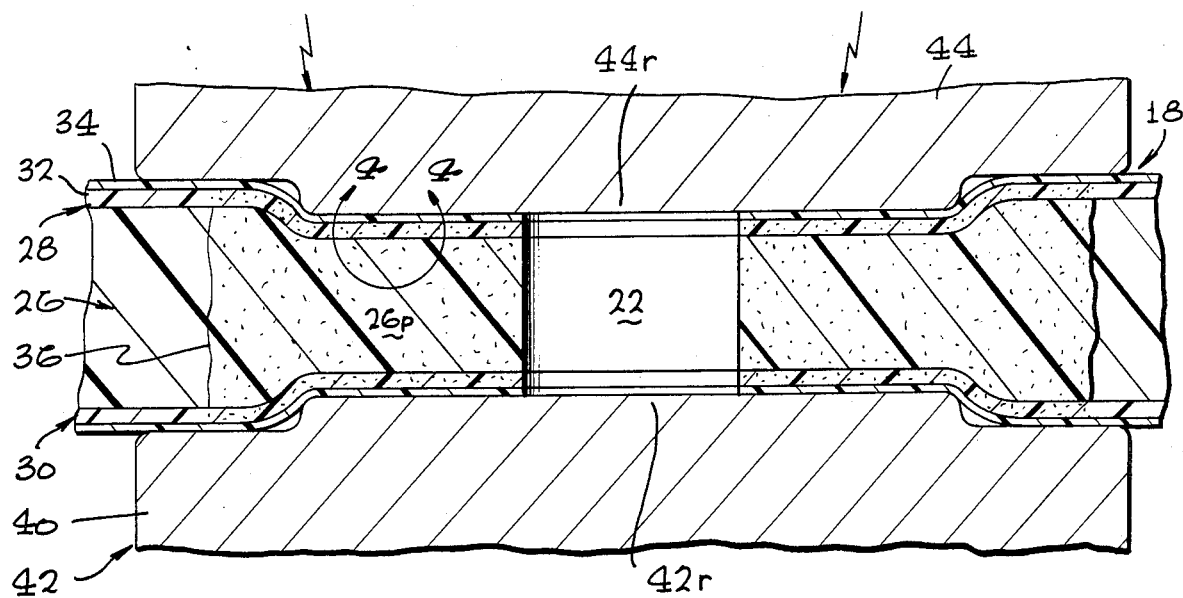
FIG. 3 is an enlarged sectional view of a portion of a membrane pack of the apparatus of FIG. 2, with the vertical dimensions exaggerated, and shows a membrane pack in the process of manufacture.

FIG. 3 shows a portion of a membrane pack 18, in the region which includes a hole 22 through which concentrate passes. The pack includes a highly porous carrier 26 such as non-woven (mat) polyester cloth. A membrane structure 28, 30 lies over either face of the carrier. Although some membrane structures are available as sheets without backing, many membrane structures are supplied with a backing 32 that has been utilized as a mold wall in the casting of a membrane 34 thereon. The membrane 34 serves to pass only the permeate of the feed fluid and reject the rest, so the permeate can flow therethrough and through the backing 32 into the porous conduit 26. The carrier 26 serves as a radial conduit, that is blocked only in the regions of the holes 22, with permeate being able to move around the sealed regions near the holes 22 to reach the periphery of the membrane pack. In order to assure that none of the concentrate moving upward along the holes 22 enters the carrier, the carrier 26 must be securely blocked in the portion thereof immediately around each hole 22, and the carrier must be securely sealed to the membrane structures 28, 30 immediately around the holes.

The sealing of the carrier 26 is easily accomplished by impregnating it with any of a variety of materials that are flowable and that will solidify, such as materials with a solvent that dries or with a catalyst that solidifies it. However, the secure sealing of each membrane structure such as 28 to the carrier 26 can be difficult to perform. Many membrane structures must be kept in a wet state at all times, and will be irreparably damaged if allowed to dry out for even a short period of time. One technique that can be utilized to seal the carrier to a wet membrane structure, is to utilize a hydrophobic (water-repellant) adhesive such as a silicone adhesive. However, in some applications a silicone adhesive cannot be utilized. For example, where a highly basic feed fluid is encountered with a pH of 10 to 12 or more, as is encountered in the pulping industry, the silicone cannot be relied upon to withstand chemical attack. A neoprene adhesive can be utilized in this application, except that it is hydrophilic (is wetted by water). When such a hydrophilic adhesive is applied to a wet membrane structure, the moisture tends to prevent adhesion of the adhesive to the membrane structure. Adhesion can be accomplished by tight clamping while the adhesive cures, but such a technique is not reliable in sealing (as opposed to merely assuring adherance) to prevent the passage of any concentrate between the carrier and membrane structure thereat.

Even where a hydrophobic adhesive can be utilized, as by impregnating a carrier with such an adhesive and leaving a layer of adhesive on the surface, the quality of the seal may be greatly reduced by less than the highest quality of equipment and workmanship. For example, if excess adhesive is applied in some locations, or low viscosity adhesive runs off some locations, the adhesive surface may become "bumpy". A membrane may not seal to the valley between two adjacent bumps.

In accordance with the present invention, sealing of the carrier 26 to a membrane structure such as 28, is accomplished by first impregnating a portion 26P of the carrier which lies around the hole 22 therein, with a flowable and solidifiable polymer 36. A thermoplastic polymer impregnates the entire porous thickness of the carrier, and polymer on the surface is squeegeed to leave a film or thin layer 38 (FIG. 4) on each surface of the carrier. The polymer is then allowed to solidify, as by allowing a solvent therein to evaporate. Where each membrane structure includes a wet membrane without any backing, the carrier then can be directly ultrasonically welded to the membrane. However, where the membrane structure is supplied by the manufacturer with a backing 32 on the membrane 34, then it is useful to also impregnate the backing 32 with a polymer.

As mentioned above, the backing 32 is utilized by the manufacturer of the membrane structure to serve as a surface on which the membrane is cast. In one example, a polysulfone membrane 34 is cast on a dense polyolefin mat (multiple non-woven fiber) backing 32 and strongly adheres thereto. The porous mat backing 32 can be impregnated with a flowable polymer, at least partially through the thickness of the backing, and the polymer can be allowed to solidify, with a layer 39 (FIG. 4) of the polymer left on the backing surface. As shown in FIG. 3, the carrier 26 with solidifed polymer therein, and the membrane structures 28, 30, are laid facewise against one another on the anvil 40 of an ultrasonic welding apparatus 42. It is easy to align the holes 22 in the carrier and membrane structures since the solidified polymers do not have to be tacky. The horn 44 of the ultrasonic welding apparatus is then pressed against the aligned carrier and membrane structures, and ultrasonic energy is applied through the horn to the assembly to ultrasonically weld the parts.

The ultrasonic energy applied to the assembly of elements, including the carrier 26 and membrane structures 28, 30, causes the separate elements of the sandwich to vibrate relative to one another at their interface. This relative vibration and the frictional heat created thereby drives out water at the interfaces, in that vapor can be seen to emanate from the wet assembly during such ultrasonic welding. The polymer 36 of the carrier is ultrasonically welded to the membrane structures, and in the case of membrane structures with polymer-impregnated backings the polymer of the carrier is ultrasonically welded to the polymer of the backings of the membrane structures. As a result, the membrane pack 18 is securely sealed to prevent the entrance of concentrate moving through the hole 22 in the carrier 16, either by passing through the pores of the carrier, which are now sealed, or between the carrier and the membrane structures which are now securely sealed together all around the hole.

One type of membrane pack that has been constructed, utilized a carrier 26 formed of a mat polyester cloth of 50 mil (one mil equals 0.001 inch) thickness. It may be noted that two 25 mil thick carrier sheets were utilized because of their easy availability, and they were joined together during the ultrasonic welding. The carrier was impregnated through its entire thickness by Bostic 1177 adhesive, which is a neoprene based contact adhesive of low viscosity that facilitates impregnation in the carrier. This neoprene based polymer does not stick well to a polysulfone membrane unless additional solvent is utilized, which is undesirable because the solvent can damage the membrane. The neoprene adhesive is applied and squeegeed to leave only a thin layer, or film, of perhaps one mil or less above the uneven surface of the carrier. A membrane structure which includes a polysulfone membrane 34 of two mil thickness and a mat polyolefin backing of five mil thickness was used, with the backing partially impregnated with the same neoprene polymer. The neoprene polymer was allowed to dry so that it was not only solid, but was not tacky. It has been found that when the adhesive is still tacky, so that some solvent is still present, the solvent can evaporate during ultrasonic welding, and form bubbles that can result in leakage. The assembly of the carrier sandwiched between the membrane structures, was then ultrasonically welded together utilizing the welding apparatus shown at 42 in FIG. 3.

As mentioned above, the membrane structure 28 is always maintained in a wet state. If a polysulfone membrane is dried it becomes less permeable, while if a cellulose acetate membrane is dried, it shrinks and may crack. In order to impregnate the backing 32, its surface opposite the membrane is blotted near the hole 22, to remove excess moisture, and the polymer such as neoprene adhesive is applied to impregnate the backing. It is found that prior to ultrasonic welding, the dried polymer can be pulled off the backing, but after ultrasonic welding the polymer holds much more strongly to the backing. It appears that the heat created in the ultrasonic welding drives away moisture where the polymer lies adjacent to fibers of the backing, to join them during the welding operation.

The backing 32 is thin but of some porosity, so that fluid could migrate laterally therethrough. The impregnation by the polymer, of about 3 to 4 mils of the 5 mil thickness of the backing, further narrows the thickness of the unblocked backing region, to further limit or totally prevent migration of fluid along the backing. Tests have been conducted on finished packs by sealing to the region immediately around a hole and applying air pressure of about 25 psi for three minutes, and noting if any air pressure decrease occurs. No leakage was found in test packs. (Water cannot be easily used as the test fluid since it passes through the membrane, while air at 25 psi did not pass through the membrane).

The ultrasonic welding apparatus 42 included an 800 watt, 20 kHz Dukane welder. A custom horn was used, and it is estimated that only about 500 watts of ultrasonic energy was applied. In welding a pack region around a 1⅛ inch hole, the pack was clamped with a pressure of 35 psi and welding energy (about 500 watts at 20 kHz) was applied for 3 seconds. At under 2½ seconds the seal was not consistently good, while much over 3 seconds bubbles and holes formed in the membrane. The welding for about 3 seconds dissipates moisture present at the interfaces by heating it to become vapor, and such vapor can be observed. The assembly is held clamped for perhaps 2 to 5 seconds after welding energy is no longer applied, to allow the welded interfaces to cool. The thin layer of polymer on the surfaces of the carrier are substantially eliminated by being melted down during the ultrasonic welding process and being pressed outwardly to form flashing around the welded area. Even if the polymer was initially applied to leave a "bumpy" surface, the bumps are eliminated in the ultrasonic welding process.

It may be noted that the anvil 40 and horn 44 of the ultrasonic welding apparatus, have raised locations 42r and 44r which project beyond lower surrounding regions of the anvil and horn. This limits the area of compression of the membrane pack so as to avoid damaging the membranes through unnecessary heating in non-welded areas. Some compression of the structure is possible because the solidified neoprene polymer is elastic, which is desirable to enable it to withstand vibrations during rapid rotation of the purification apparatus in which it is utilized.

The construction of the carrier and membrane structures can vary for different applications. FIG. 5 shows a membrane pack 50, which includes a carrier 52 that includes a stiffener sheet of a solid thermoplastic, and which also includes porous sheets 54,56 formed of mat polyester fibers or cured phenolic impregnated paper. The membrane structures 58, 60 may be cellulose acetate, which is sometimes not supplied with any backing so that each structure includes only a membrane. The two carrier sheets 54, 56 are each impregnated with a flowable polymer that is allowed to solidify and become non-tacky. Then, the assembly including the stiffener 53, impregnated carrier sheets 54, 56 and the wet membrane structures or membranes 58, 60 are assembled with their holes aligned, and ultrasonically welded together. In a single welding, each of the carrier sheets such as 54 is welded at one face to the membrane 58 and at the other face to the stiffener 53.

In some applications, a hydrophobic adhesive such as silicone can be used to seal pores in the carrier as well as to adhere to a membrane structure. Although adhesive bonding could be utilized, it is found that an even more reliable connection to the membrane structure can be obtained by ultrasonically welding the silicone polymer to the membrane structure (which can include a silicone-impregnated backing). The silicone adhesive is allowed to dry to a largely nontacky state, and then is heat welded to the other element of the membrane pack. Although ultrasonic welding provides a secure heat weld, it should be noted that RF (radio frequency) welding can also provide a welding connection, by adding an RF sensitive material such as fine metal powder to the polymer. It also should be noted that the present method, of impregnating a carrier with a polymer that is allowed to dry and which is then heat welded to a membrane structure, can be used to seal the edges of a variety of purification devices including those with a spiral wound membrane pack.

FIGS. 6 and 7 show another arrangement for sealing wet membrane structures 70, 72 to a carrier 74, to assure that the walls or edge of a hole 75 in a membrane pack 77 are sealed. A ring-shaped insert 76 of thermoplastic polymer lies closely within an enlarged hole 78 formed in the carrier. Although the carrier 74 is porous, the insert 76 is nonporous. The holes 80 in the membrane structures and the hole 82 in the insert are of substantially the same diameter. The faces of the insert 76 are sealed to the membrane structures by ultrasonic welding. Where the membrane structures are unbacked, they can be directly sealed to the insert without the use of any impregnating.

The insert 76 is initially thicker than the carrier 74, and is reduced in thickness in the course of ultrasonic welding. A membrane pack of the type shown in FIGS. 6 and 7 has been constructed using an insert 76 of Veristrate, a double sided sealant tape manufactured by the 3M Company. An adhesive was utilized, not because of its adhesive characteristics, but because it has a low melting temperature, to avoid damage to the membrane. The adhesive will not stick to a wet membrane. The ultrasonic welding displaces the water on the membrane structures, and heats the adhesive so it is more flowable and active. The carrier 74 was about 50 mil thick, while the insert 76 was initially about 10 to 30 mil thicker. A stop was utilized on the welding horn to limit compression of the insert. The insert had an inside hole diameter of about 2 inches and an outside diameter of about 2¼ inches.

Thus, the invention provides a membrane pack, including a pack and method for constructing it, which enables the secure sealing of an edge of the carrier and secure sealing of the carrier to membrane structures lying against one or both surfaces of the carrier, and which is useful in joining to a wet membrane structure. A wet membrane structure can be joined to a porous carrier by impregnating the carrier with a solidifiable and flowable polymer, with a layer of the polymer left on a surface of the carrier and with the polymer allowed to solidify. A membrane structure in a wet state can be placed against the carrier to lie against the solidified polymer on the carrier surface, and they can be pressed together while welding energy such as in ultrasonic welding is applied. The ultrasonic welding can drive off and vaporize moisture at the interfaces to be welded, to enable secure joining even where the polymer that impregnates the carrier is of a hydrophilic nature. Where the membrane structure includes a porous backing bonded to a membrane, the backing itself can be impregnated with a solidifiable polymer which is allowed to solidify and which is welded to the solidified polymer on the carrier. It is also possible to utilize a nonporous thermoplastic insert within a hole in a carrier, and to weld the membrane structure to the insert.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A membrane pack comprising:
   a sheet-like carrier which is highly permeable to the lateral flow of fluid therein, and which has an edge;
   a quantity of solidifiable flowable material impregnating a selected portion of said carrier near said edge to lie at opposite faces thereof as well as below the surface to block the lateral passage of fluid therein; and
   a pair of membrane structures lying over opposite faces of said carrier;
   said solidifiable material in said carrier being in a solid state and heat welded at its opposite faces which lie at opposite faces of said carrier, to said membrane structures.

2. The membrane pack described in claim 1 wherein:
   each of said membrane structures includes a membrane and a backing in facewise attachment to each other, and a quantity of solidifiable flowable material impregnating said backing at least in a portion of the backing which lies opposite said membrane;
   said material which impregnates said backing lying at a face of the backing opposite said membrane, being in a solid state, and being heat welded to the material which impregnates said carrier.

3. A membrane pack with a sealed edge comprising:
   a sheet-like carrier which is permeable to the lateral flow of fluid therein, said carrier having an edge;
   an insert of substantially nonporous thermoplastic polymer lying in the same plane as the carrier and having a first edge lying against said edge of said carrier but free of interlocking connection therewith, and an opposite second edge forming an edge of the membrane pack; and
   a membrane structure lying over a face of said carrier and extending beyond said carrier edge to lie over said insert, said insert being heat welded to the portion of said membrane structure which lies beyond said carrier edge, whereby to seal the carrier against the inflow of fluid therein which passes across said second edge of the insert.

4. The membrane pack described in claim 3 wherein:
   said carrier has a hole with walls forming said carrier edge, said insert is of annular shape and lies closely within said hole, and said membrane has a hole of about the same diameter as the inside diameter of said annular insert and is aligned therewith.

5. A membrane pack comprising:
   a porous sheet-like carrier having a hole;
   a substantially ring-shaped nonporous insert lying closely within said carrier hole, but with said insert being free of undercut surfaces interlocking with said carrier, to permit simple placement of the insert in the hole; and
   a membrane structure lying over said carrier and having a hole of about the same diameter as the hole in said ring-shaped insert;
   the holes in said membrane structure and insert being aligned, and said membrane structure being joined facewise to said insert.

6. A method for forming a membrane pack having a fluid-sealed edge, comprising:
   laying a nonporous insert that has a hole, in a hole of a carrier to fit closely within the carrier hole, but with the insert and carrier being free of interlocking connection;
   laying a membrane structure having a hole that is smaller than said carrier hole, over said carrier and insert and with the membrane structure hole substantially aligned with the insert hole; and
   ultrasonically welding said membrane facewise to said insert.

7. A method for joining a membrane structure to a porous carrier, where the membrane structure includes a membrane and a porous membrane backing bonded to the membrane, comprising:
   impregnating said carrier with a solidifiable flowable, thermoplastic polymer, leaving a film of said polymer on a surface of said carrier, and allowing said polymer to solidify;
   impregnating said porous membrane backing with a solidifiable flowable polymer, leaving a film thereof on said backing and allowing said film to solidify;
   placing said membrane structure against said carrier to lie against the polymer on the carrier surface, and pressing them together while applying ultrasonic welding energy to weld the polymer film on said membrane backing to the polymer film on said carrier.

8. A method for joining a membrane structure to a porous carrier, comprising:
   impregnating a portion of said carrier with a solidifiable flowable, thermoplastic polymer through the entire porous thickness of the carrier portion to block the lateral flow of liquid therein, leaving a layer of said polymer on opposite faces of said carrier, and allowing said polymer to solidify; and
   placing two membrane structures against opposite faces of said carrier so each lies against the polymer layer at a different face of the carrier surface, and pressing them together while applying ultrasonic welding energy to ultrasonically weld said membrane structures simultaneously to said carrier.

9. A method for sealing a porous sheetlike carrier to a wet membrane structure which includes a membrane and a porous backing attached facewise to the membrane, by the use of a flowable but solidifiable polymer which is wetted by water, comprising:
   applying said polymer while in a flowable state into a portion of said carrier to impregnate said carrier, leaving a layer of said polymer on a face of said carrier, and solidifying said polymer;

impregnating said porous membrane backing with a flowable but solidifiable polymer, leaving a layer thereof on said backing and allowing said layer to solidify;

pressing said carrier against said wet membrane structure so that layer of polymer on the carrier face presses on the wet membrane structure, and ultrasonically welding the impregnating polymer layer on said membrane backing to the impregnating polymer layer on said carrier.

10. A membrane pack assembly comprising:

a porous carrier having an edge;

a wet membrane structure with an edge aligned with the edge of said carrier and lying facewise adjacent to said carrier, said membrane structure including a membrane and a backing;

said carrier being impregnated with a solid thermoplastic polymer immediately adjacent to said edge, said backing being impregnated with said polymer, and the impregnating polymer in said carrier and backing being heat welded together.

* * * * *